Figure 1:
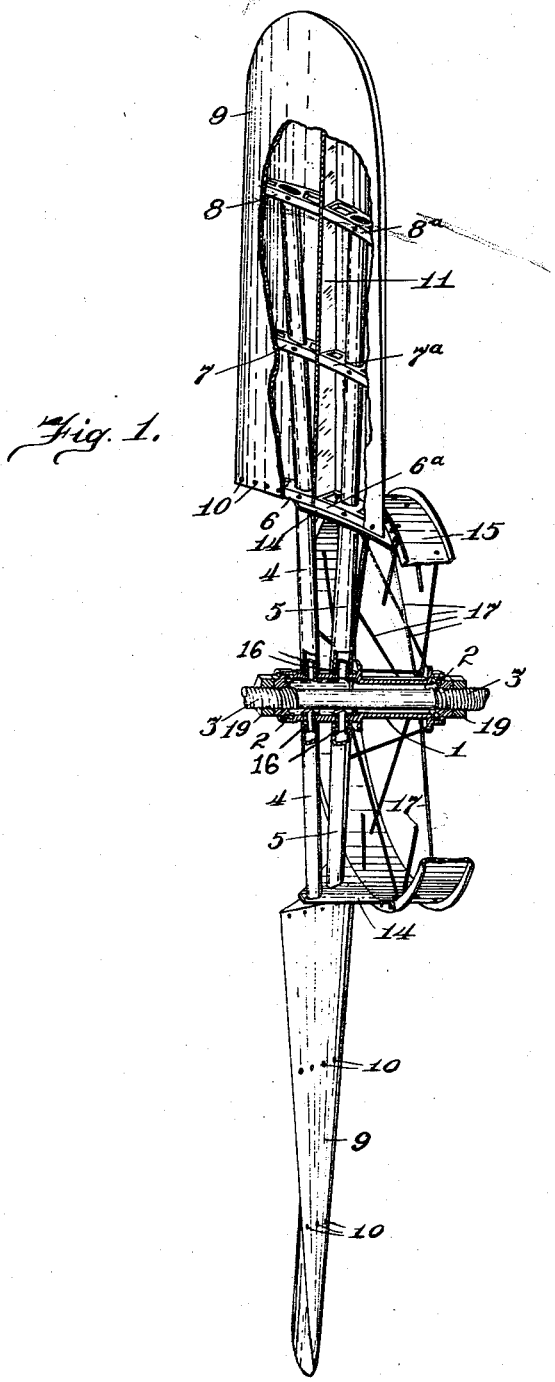

H. W. JACOBS.
PROPELLER.
APPLICATION FILED FEB. 24, 1911.

1,000,602.

Patented Aug. 15, 1911.
4 SHEETS—SHEET 1.

Witnesses
R. E. Wighton
Milton Lenoir

Inventor
Henry W. Jacobs
By Heidman & Stout
Attorneys.

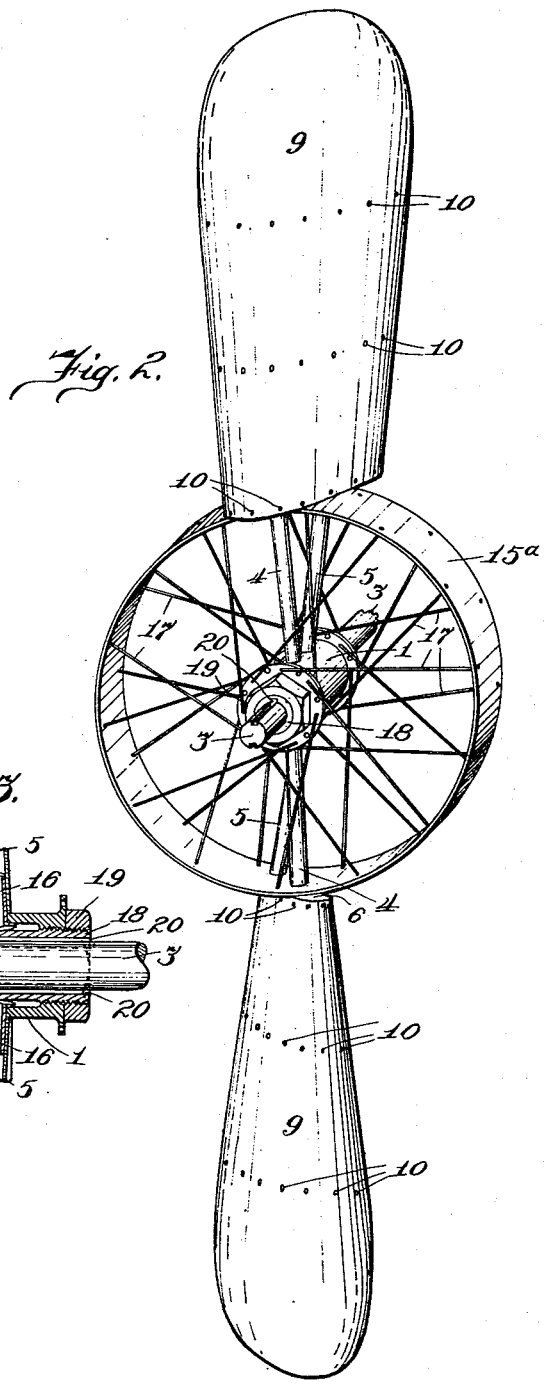

H. W. JACOBS.
PROPELLER.
APPLICATION FILED FEB. 24, 1911.

1,000,602.

Patented Aug. 15, 1911.

4 SHEETS—SHEET 3.

H. W. JACOBS.
PROPELLER.
APPLICATION FILED FEB. 24, 1911.
1,000,602.
Patented Aug. 15, 1911.
4 SHEETS—SHEET 4.
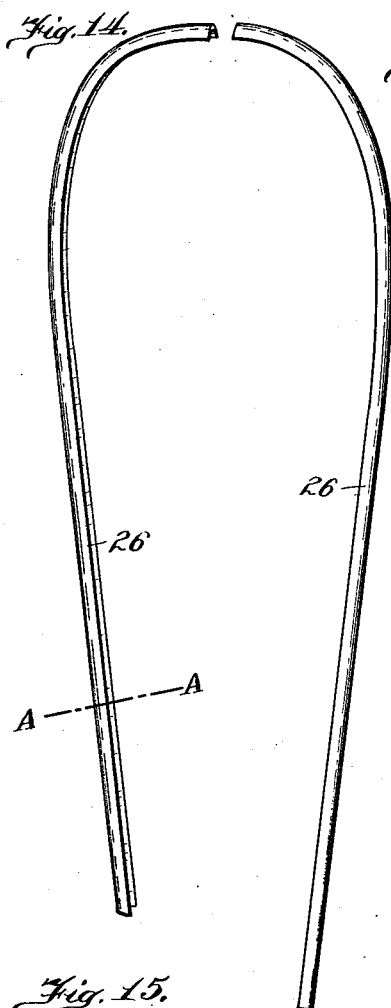
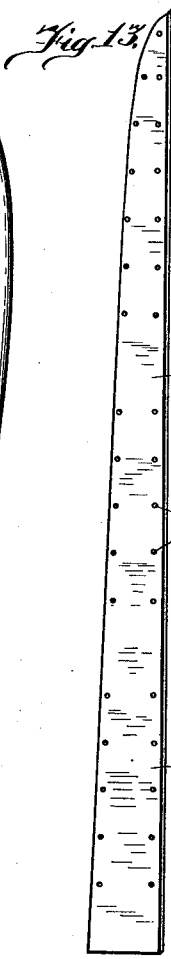
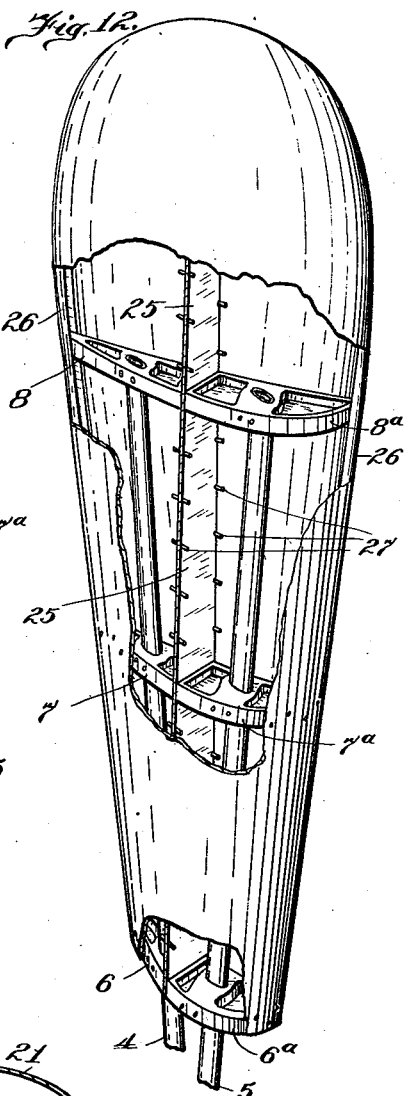
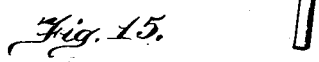
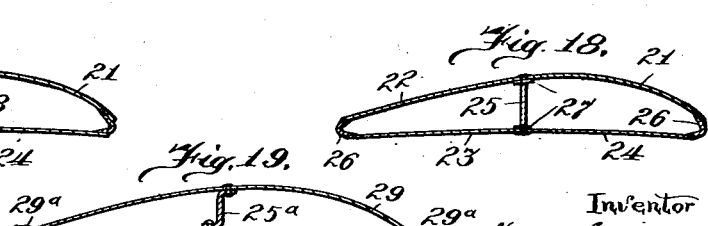

UNITED STATES PATENT OFFICE

HENRY W. JACOBS, OF TOPEKA, KANSAS.

PROPELLER.

1,000,602.     Specification of Letters Patent.     Patented Aug. 15, 1911.

Application filed February 24, 1911. Serial No. 610,546.

*To all whom it may concern:*

Be it known that I, HENRY W. JACOBS, a citizen of the United States, residing at Topeka, in the county of Shawnee and State of Kansas, have invented certain new and useful Improvements in Propellers, of which the following is a description, reference being had to the accompanying drawings, which form a part of my specification.

The object of my invention is to produce a propeller wherein the torque is applied to the inner ends of the propeller blades instead of at the hub, that is, at a distance from the axis; this being accomplished by providing a pulley, where a belt is employed,—a sprocket wheel, when a chain is used, or bevel gear, when a shaft and pinion is employed, or a plain band when the method of direct drive is used,—which is built integral with the propeller at the inner ends of the blades. This method of applying the power allows for a considerable leverage, which will give greater strength and rigidity to propeller blades, and keep them from twisting edgewise under the strain to which they are subject; the driving mechanism, being thus placed, acts in the nature of a fly wheel, and insures a steady rotation of the propeller, producing a desirable gyroscopic action.

A further object of my invention is to produce a propeller which may be built entirely of metal, but which will be light and durable, thereby providing an efficient propeller more especially intended for use in connection with aerial craft.

A further object of my invention is to produce a propeller wherein the covering of the blades may either be made of several sheets of metal or formed from a continuous sheet of metal, as will more fully be understood from the following detailed description.

In the drawings:—Figure 1 is a perspective view of a two-bladed propeller with a pulley secured to the inner ends of the blades; a portion of the mechanism being shown in section, while a part of one of the blade-covers is broken away to show the internal construction thereof. Fig. 2 is a perspective view of a two-bladed propeller showing a modified form wherein the power is intended to be applied to the hub and transferred to a distributing band or member. Fig. 3 is a cross sectional view taken through the hub and adjacent ends of the spokes of Fig. 2. Fig. 4 is an end view of a flat sheet from which the propeller blade covers are made. Fig. 5 is an end view of the sheet with one end thereof bent so as to form a web within the blade or cover. Fig. 6 is a sectional view of the sheet, showing one end bent over into place to form one-half or part of the blade; while Fig. 7 is a similar sectional view with the other end of the sheet bent over into shape to form the other portion of the blade; the first mentioned half or portion being shown united at the free end to the body of the blade or cover. Fig. 8 is an end view of a cover sheet, showing a modified method of bending or "breaking" the same. Fig. 9 is a cross sectional view of the cover sheet shown in Fig. 8, bent into form prior to the securing or welding of the free ends thereof. Fig. 10 is a similar sectional view of the construction shown in Fig. 9 with the free ends secured or welded in place, showing the blade-cover in completed form. Fig. 11 is an end view of one of the propeller spokes. Fig. 12 is a perspective view of a propeller blade with a part of the cover cut away to show the internal construction of a modified form. Fig. 13 is a perspective view of a detail of the construction shown in Fig. 12, to wit, of the central rib extending longitudinally through the blade. Fig. 14 is a detailed view of the parts employed in forming the edges of the blade constructed as shown in Fig. 12. Fig. 15 is a cross sectional view taken on the line A—A of Fig. 14. Fig. 16 is a cross sectional view of the propeller blade shown in Fig. 12 before the respective parts are welded or secured together. Fig. 17 is a similar view showing a modified form or method of construction. Fig. 18 is a cross sectional view taken through the propeller blade shown in Fig. 12 with the respective parts properly secured or welded together. Fig. 19 is a cross sectional view of the propeller blade showing still another modified form or method of securing the respective parts together.

The purpose of my invention is to produce a practicable, substantial and at the same time commercially economical propeller, which is more especially adapted for use in connection with aerial structures; the propeller resulting from my invention being one which will be highly efficient and will possess sufficient strength to withstand the rough usage to which a device of this character is subjected.

In the construction illustrated in Fig. 1, I employ a hub 1, which is mounted through ball bearings 2, 2, at each end thereof, on shaft 3. Secured to the hub 1, in a manner to be more fully hereinafter set forth, are the propeller spokes 4 and 5. These spokes are also rigidly secured to the two-part or composite ribs 6, 7, and 8, which form the frame work for the propeller, over which the sheet or metal covering 9 is formed and fastened in any suitable manner, as for example by rivets as shown at 10.

The metal cover sheet 9 may be formed from a flat sheet A, as illustrated in Fig. 4, or formed in the manner illustrated in Figs. 12 to 19, wherein several sheets are employed. I will first describe the methods illustrated in Figs. 4 to 11. The sheet A, see Fig. 4, is first bent or "broken" as at $a$ in Fig. 5, to constitute a longitudinally extending rib 11 for the cover sheet, see Figs. 1 and 5. The sheet is then bowed or bent as shown in Fig. 6, so as to bring the rib 11 adjacent to the body portion of the sheet A. The portion of the ribs 6, 7, and 8, having been previously rigidly secured to the spoke 4, are then inserted into the partially formed cover sheet shown in Fig. 6, after which the free edge 12 of the rib 11 is permanently secured to the side of the cover-sheet in any suitable manner, but preferably by the autogenous method of welding. The flat or "unbroken" portion of the sheet is then bowed or bent by suitable mechanism to the shape shown in Fig. 7; the remaining portion or halves of the ribs $6^a$, $7^a$, and $8^a$, which have previously been rigidly secured to the spoke 5, are then forced into place between the overlapping parts of the sheet. The free edge 13 of the sheet is then secured to the adjacent edge $13^a$ in any suitable manner, but preferably by welding, as previously described. The cover-sheet may then be secured to the ribs 6, 7, and 8 by any suitable means as for example screws or rivets as illustrated at 10, Fig. 1.

In order to permit the walls or faces at the outer ends of the blades to be brought together so as to produce a thin edge, it is understood, of course, that the web-portion 11 must be made to taper toward the outer ends of the blades, as can be seen in Fig. 1.

When the blade-covers have been completely formed, the reinforcing web 11 will extend from wall to wall, and is preferably secured to both walls as described.

Instead of forming the cover-sheet in the manner just described, it may be accomplished by having the web extended from the front or concave side or wall of the propeller to the back or convexed side or wall, thereby permitting the final welding or fastening to be made on the front side of the blade.

Instead of employing the method of forming the cover-sheet illustrated in Figs. 5, 6, and 7, the method illustrated in Figs. 8, 9, and 10 may be used, wherein the sheet A is "broken" or bent substantially along the longitudinal center of the sheet to form rib 11. When this method is employed, the part or portion $b$ is bent backward or folded over upon itself, by suitable mechanism, as shown in Fig. 9 to bring the edge adjacent to the rib 11; and the part $c$ is bent or folded back beneath itself so as to bring the outer or free edge of the sheet adjacent to the rib 11, as clearly shown. It is understood, of course, that the portions of the ribs 6, $6^a$, —7, $7^a$,— and 8, $8^a$, are inserted within the covering in the manner previously described, and the free ends are then welded or otherwise secured to the web portion as illustrated in Fig. 10. When this method is employed, both seams will be on the outside of the cover, where they are more easily made.

The spokes 4 and 5 are preferably made of a sheet of metal, or other substantially non-deformable material, which has been previously "broken" and bent in a manner similar to that just described with reference to the cover-sheet of the propeller, so as to form a spoke, which may be elliptical in shape as shown, and preferably provided with an internal longitudinally extending web portion $d$, as more clearly shown in Fig. 11. It will be seen that the spokes 4 and 5 may thus be made from a continuous sheet with the web-portion forming an integral part thereof; the side edges of the sheet being properly secured to the central or web-portion in any suitable manner, as for example by the autogenous-method of welding.

Before the spokes 4 and 5 are secured to the hub 1, the bands or braces 14, 14, are slipped over the free ends of the spokes so as to take against the ribs 6 at the inner ends of the propeller-blades and are there rigidly secured, preferably to both the ribs and the cover-sheet 9, (when the construction shown in Fig. 1 is used); any suitable method of fastening may be employed. The flanged pulley 15 may now be secured to the braces 14, by rivets or in any other suitable manner. The spokes 4 and 5 are then fastened to the hub 1, preferably in the manner illustrated in Fig. 1, by employing the hollow thimbles 16. These thimbles 16 are inserted into place through the ends of the hub 1, and are then secured by brazing or otherwise. Spokes 17, preferably made of wire, may then be inserted within the flanged band or pulley 15, so as to secure the flanged rim to the hub 1, thereby completing the propeller.

It is apparent from the construction just described and illustrated in Fig. 1, that a belt may be employed to take about the pulley 15 for the purpose of driving the propeller; it being understood, of course, that suitable lock nuts 19, or other mechanism, are employed whereby the hub is properly held on the axle or shaft 3.

Taking up the description of the methods of construction illustrated in Figs. 12 to 19, it will be seen that the propeller blade, as illustrated in Fig. 12, is made up of a number of parts as can more clearly be seen in the cross sectional view beginning with Fig. 16, wherein the blade-cover and the central longitudinally extending rib are composed of the separate pieces 21, 22, 23, 24, and 25. In the constructions illustrated in Figs. 16 to 18 inclusive, the outer edges of the blades are formed by the flanged members or pieces 26, illustrated in Fig. 14 and in cross section in Fig. 15. The edges of the cover-sheets 21, 22, 23, and 24, adjacent to the flanged members 26, are preferably made to overlap the flanged members and be secured thereto by welding; the autogenous method being preferably employed. The central longitudinal rib 25 is placed between the composite ribs 6, 6ª, 7, 7ª, and 8, 8ª, as clearly indicated in Fig. 12, before all of the cover-sheets have been properly secured in place. In order to prevent sagging or warping inwardly of the cover-sheets, I have illustrated the central rib 25 provided with a number of transversely extending pins 27, adjacent to both edges of the rib as clearly shown in Figs. 12, 16, and 18; these pins taking through suitable openings previously formed in the rib 25 as indicated at 27ª, in Fig. 13. The connection or joint between the cover sheets 21, 22 and central rib 25, and the connection between the cover-sheets 23, 24 and the rib 25 are then welded, or otherwise properly secured in place, with the edges of the cover sheets which abut against the central rib, taking over the pins 27 as clearly indicated in Figs. 16 to 18, so as to form a blade as clearly shown in Fig. 18, where all the parts are properly welded in place. The ribs 6, 6ª, 7, 7ª, and 8, 8ª, are secured to the spokes 4 and 5 in the manner previously described with reference to the construction shown in Fig. 1.

Instead of employing the method illustrated in Fig. 16 for preventing the warping or sagging of the cover sheets, the central rib 25 may be provided with the angle irons 28, properly secured to both sides of the rib and at the proper distance from both edges thereof, as clearly shown. In the drawing Fig. 17, I have shown the angle irons 28 riveted to the rib, although it will be readily seen that any other suitable method of securing the angle irons in place may be employed. In this construction, as in the construction illustrated in Fig. 16, the edges of the rib 25 are permitted to protrude slightly beyond the outer surfaces of the blade so as to provide sufficient metal to permit of the proper welding of the parts together; the parts assuming the relation illustrated in Fig. 18, after the same have been properly welded.

In Fig. 19, I show still another modified form or method of forming my propeller blade, in which two sheets, 29 and 30, of metal are employed to form the cover of the propeller blade; the sheets being properly braced by the central rib 25ª, which is shown in the nature of a Z bar, riveted to the front and back sheets 30 and 29. In this construction, I prefer to have the outer edges of sheets 29 and 30 riveted together as clearly indicated at 29ª, with the outer edges of the front sheet 30 lapping over the edges of back sheet 29, adjacent to the riveted seam, so as to strengthen and reinforce the seam. These edges may then be properly soldered or otherwise treated in order to form a smooth joint or connection.

It is, of course, understood that before all of the sheets are secured in place, the transversely extending composite ribs 6, 7, and 8, which have previously been secured to the respective spokes 4 and 5, are inserted in proper place between the sheets as previously described with reference to the construction shown in Fig. 1.

The methods of forming the blades, shown in Figs. 12 to 19 are not only more simple than the one illustrated in Figs. 1 to 10, but also permit of a better distribution of stresses, with a truer contour of blades which possess great strength. The remainder of the propeller may be constructed as previously described with reference to the construction shown in Fig. 1 or the construction shown in Fig. 2 as hereinafter set forth.

By employing this method of building up the various parts of the propeller, it will be noted that a very strong construction is produced. Instead however of employing a flanged band or pulley, as shown in Fig. 1, a gear might be employed secured to the spokes and propeller-blades in a manner similar to that just described; or a plain band, somewhat in the nature of a fly wheel, may be used, as illustrated in Fig. 2. In the construction shown in Fig. 2, the power is delivered to the propeller through the propeller-hub and fly wheel, or distributing band 15ª, by a directly connected engine. The plain band 15ª, can be so secured as to obviate the necessity for employing the brace bands 14, as the spokes 4 and 5 take through the band 15ª itself, as clearly illustrated. The propeller, as well as the propeller ribs, are built up in the same manner, as previously described with reference to the construction shown in Fig. 1. The spokes 4 and 5 are secured to the hub 1, preferably by inserting the thimbles 16, 16, into the ends of the spokes through the ends of the hub and then securing them in position either by brazing or in any other suitable way, see Fig. 3. When this construction is employed, the ball bearings 2, 2, shown in Fig. 1, are replaced by the thimble 18, which is firmly secured to the hub 1 in any suitable manner, as for example by having it threaded into the hub and locked in place by suitable lock nuts 19, 19, as more clearly shown in Fig. 3. This thimble 18 may in turn be secured to the engine shaft 3 by the keys 20, 20, or in any other approved manner.

It is to be noted that, in the construction shown in Fig. 2, the power will be transmitted to the distributing band 15ª by means of the wire spokes 17, as is the case with the construction shown in Fig. 1.

In either construction shown in Figs. 1 and 2, or in a construction where the pulley 15 is replaced by any other suitable driving means, as for example a sheave wheel, sprocket wheel or gear, the fact that the weight of the pulley, or other suitable driving means, is applied as described, at a radius whose ratio to that of the propeller is large, the pulley or driving means produces a fly wheel effect on the propeller and greatly steadies its motion, producing at the same time a noticeable gyroscopic effect.

By constructing the propeller blades in the manner described, great strength, and at the same time lightness in weight, is obtained, while undue obstruction to the passage of the propeller blades through the air is eliminated.

I have shown and described the simplest forms and methods embodying my invention, but it is apparent that a number of changes may be made as have been herein indicated, or an additional number of propeller blades may be employed, without departing from the spirit of my invention, and I do not wish to be understood therefore as limiting myself to the exact constructions shown and described, but

What I claim as my invention and wish to secure by Letters Patent is:—

1. A propeller blade formed from a continuous sheet bent so as to provide an integral web extending longitudinally therethrough.

2. A propeller blade composed of transversely extending composite ribs, spokes taking into and secured to the separate parts of said ribs, and a cover formed from a sheet of metal bent so as to take about said ribs with a portion extending intermediate of the adjacent ends of said ribs to form a reinforcing web.

3. A propeller blade formed from a continuous sheet bent into the desired shape and so as to provide an integral web contacting with both sides or walls thereof.

4. A propeller blade of the class described, composed of a continuous sheet of metal "broken" longitudinally so as to form an angularly extending portion, the sheet being bent into the desired shape with the integral angularly extending portion substantially at the longitudinal center thereof to provide a reinforcing web.

5. A propeller blade of the class described, composed of a cover-sheet bent into the desired shape, a reinforcing portion extending longitudinally therein and united to both walls or faces thereof, transversely extending ribs arranged on both sides of said reinforcing portion and about which said sheet takes, and metallic spokes secured to said ribs and extending through the inner ends of the propeller.

6. A propeller of the class described, the blade whereof is composed of a continuous sheet of material bent longitudinally so as to form an angularly extending portion, the sheet being formed into the desired shape with said angularly extending portion brought intermediate of the side faces or walls of the blade, transversely extending ribs located to the sides of said portion, spokes taking into and secured to said ribs and protruding from the inner ends of the propeller-blades, and means secured adjacent to the inner ends of said propeller-blades and at a distance from the axis about which it revolves, whereby power is transmitted to said blades.

7. A propeller whose blades are composed of sheet metal bent to form a longitudinally extending reinforcing portion intermediate of the side walls or faces of the blade, and means secured at the inner ends of the blades whereby power is transmitted to the blades.

8. A propeller of the class described, whose blades are composed of a sheet of suitable material bent so as to provide a reinforcing web intermediate of the side walls or faces of the blade, driving means secured to the inner ends of the blades, said means being arranged at a distance from the axis about which the propeller revolves.

9. A propeller whose blades are formed from one or more sheets of material bent into shape so as to provide a hollow blade, a portion of the sheet or sheets being "broken" so as to provide an internal longitudinally extending web.

10. A propeller whose blades are formed from continuous sheets "broken" longitudinally, the sheets being bent into the desired shape with the longitudinally "broken"

portion brought intermediate of and connected with the side walls or faces of the blades to form reinforcing webs.

11. A propeller blade formed from a continuous sheet of substantially non-deformable material bent so as to provide an integral longitudinally extending web tapering toward one end thereof.

12. A propeller blade formed from one or more sheets of substantially non-deformable material, so bent as to provide a longitudinally extending rib with which the side edges of the sheet or sheets unite.

13. A propeller comprising blades formed from sheets of substantially non-deformable material bent so as to produce hollow blades with an integral longitudinally extending web, transversely extending ribs located to opposite sides of said web, spokes made from sheets of substantially non-deformable material and with a longitudinally extending reinforcing web, the sheets being bent into the desired shape with their side edges brought adjacent to said web and secured in place, said spokes taking into the blades and being secured to the ribs, a hub, means whereby said spokes are secured to the hub, and driving means located at a point intermediate of the tips of the blades and said hub and having operative connection with the blades whereby the latter are revolved.

14. A propeller comprising blades made by bending sheets of substantially non-deformable material so as to provide reinforcing webs between the front and rear walls or faces thereof, spokes made of sheets of substantially non-deformable material bent so as to produce hollow spokes provided with reinforcing webs within, a hub, thimbles taking into the spokes and through the hub to form an integral union, and driving means operatively connected with blades and arranged to describe a circle whose radius extends to a point intermediate of the hub and the tips of the blades.

15. A propeller comprising a hub, a composite frame, the members of which conform to the transverse contour of the blades, with a portion of the composite frame constituting the inner end of the blade, spokes extending through and secured to the respective members of the frame and to the hub, adapted to carry the centrifugal strain on the blade, a cover-sheet formed of relatively thin and substantially non-deformable material formed about and secured to said frame, cover-sheet reinforcing means extending longitudinally within the blade and intermediate of the composite frame, circular driving means secured at the inner ends of the blades and at a distance from the hub, and mechanism for securing said means to the hub, said mechanism being adapted to carry the torque.

16. A propeller, the blades whereof are composed of sheets of suitable material formed into shape with the outer edges secured together so as to provide a hollow blade, transversely extending ribs secured within said blade, one or more spokes extending into the blade and said ribs and secured thereto, said spokes extending beyond the inner ends of the blades, a hub to which said spokes are secured, circular driving means secured at the inner ends of the blades and at a distance from the hub, and mechanism adapted to carry the torque and secure the means to the hub.

17. In a propeller whose blades comprise a cover made from one or more sheets of substantially non-deformable material formed so as to provide two separated walls or faces uniting at the sides and outer end, means extending longitudinally between the walls so as to provide a reinforcing web, a hub, power transmitting means secured adjacent to the inner ends of the blades for transmitting power directly thereto, said means being arranged at a distance from the hub, and spokes extending from the hub into the blades of the propeller.

18. In a propeller, the combination of a hub, hollow blades formed from sheets of substantially non-deformable material, one or more spokes secured within the blades and extending out from the inner ends thereof, said spokes being secured to the hub, and driving means operatively connected with the blades at a point intermediate of the outer ends or tips of the blades and the hub and at a distance from the latter, with mechanism adapted to carry the torque and secure the driving means to the hub.

19. In a propeller, the combination of a hub, hollow blades formed from sheets of substantially non-deformable material, one or more spokes secured within the blades and extending out from the inner ends thereof, said spokes being secured to the hub, driving means operatively connected with the blades at a point intermediate of the outer ends or tips of the blades and the hub at a distance from the latter, and mechanism adapted to carry the torque and secure the driving means to the hub, with means whereby the outer edges of the blades are reinforced.

HENRY W. JACOBS.

Witnesses:
 FRANK MITCHELL,
 DAVID H. OWEN.